United States Patent
Moehler

(10) Patent No.: US 6,744,576 B2
(45) Date of Patent: Jun. 1, 2004

(54) RECOGNITION OF THE MAXIMUM POSITION OF A REVOLVING DIAL OR SLIDE ON MICROSCOPES

(75) Inventor: Gunter Moehler, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/049,802
(22) PCT Filed: Jul. 6, 2001
(86) PCT No.: PCT/EP01/07768
§ 371 (c)(1),
(2), (4) Date: Jun. 19, 2002
(87) PCT Pub. No.: WO02/03119
PCT Pub. Date: Jan. 10, 2002

(65) Prior Publication Data
US 2002/0163718 A1 Nov. 7, 2002

(30) Foreign Application Priority Data
Jul. 6, 2000 (DE) .......................................... 100 32 395

(51) Int. Cl.⁷ ............................. G02B 7/16; G02B 21/00
(52) U.S. Cl. ....................................... 359/821; 359/381
(58) Field of Search ................................ 359/384, 381, 359/380, 821, 392, 394, 391

(56) References Cited

U.S. PATENT DOCUMENTS

| | | | |
|---|---|---|---|
| 5,337,177 A | 8/1994 | Toyoda et al. | |
| 5,737,134 A | 4/1998 | Watanabe et al. | |

FOREIGN PATENT DOCUMENTS

| | | |
|---|---|---|
| DE | 36 30 632 | 9/1987 |
| DE | 37 11 843 | 8/1988 |
| DE | 690 21 608 | 5/1996 |
| DE | 198 39 777 | 3/1999 |
| JP | 3-213811 | 9/1991 |
| JP | 4-020911 | 1/1992 |
| JP | 4-093908 | 3/1992 |
| JP | 8-029695 | 2/1996 |
| JP | 8-201701 | 8/1996 |
| JP | 11-023975 | 1/1999 |

Primary Examiner—Scott J. Sugarman
Assistant Examiner—Deborah Raizen
(74) Attorney, Agent, or Firm—Reed Smith LLP

(57) ABSTRACT

A method for detecting the maximum quantity of possible positions of an exchangeable nosepiece or slide in a microscope system is disclosed. The method comprises the steps of: starting from an initial position which corresponds to a first position, adjusting the maximum position; comparing the maximum position to a position registered in a memory; and storing the results of the comparison.

1 Claim, 1 Drawing Sheet

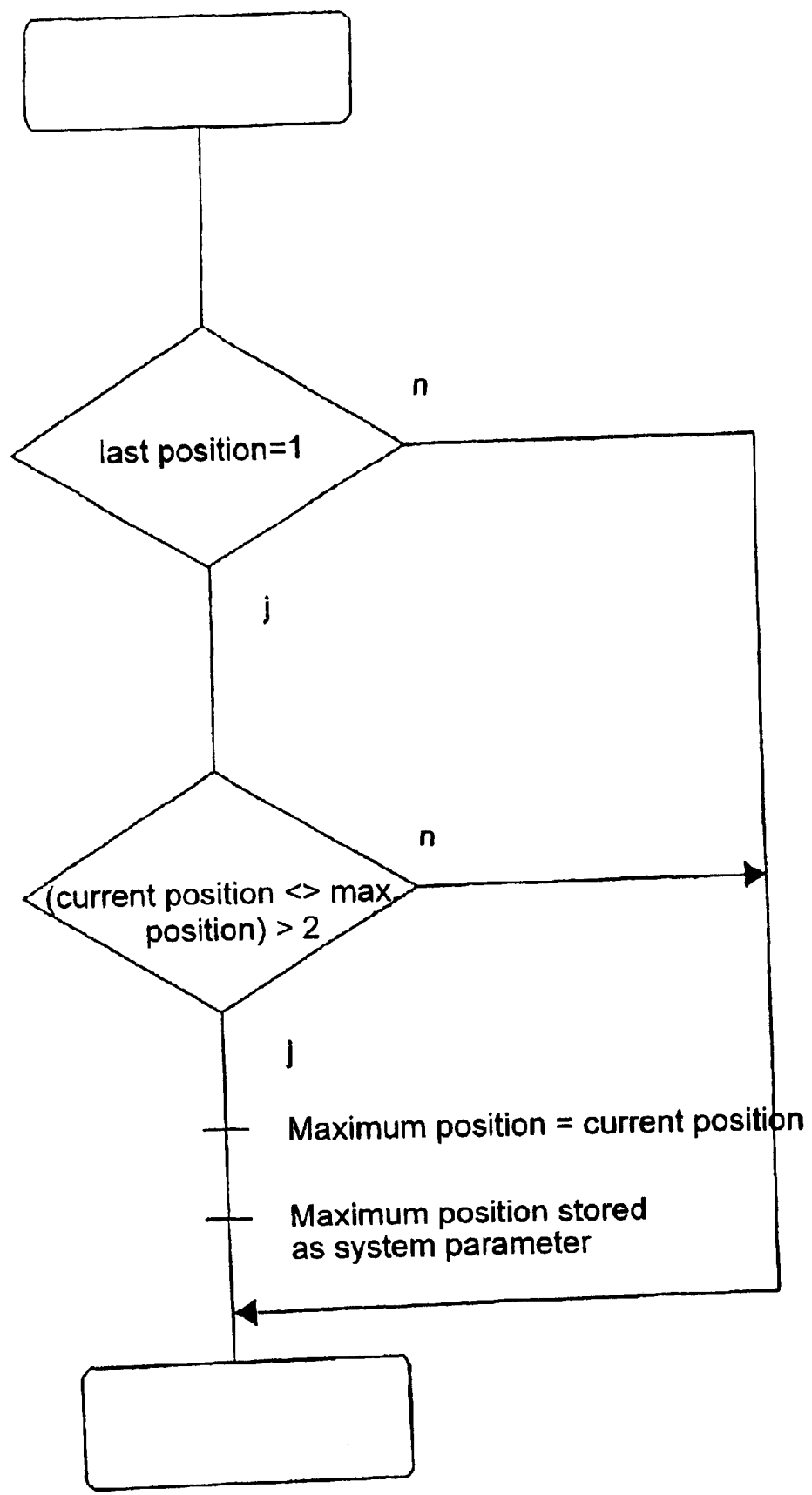

RECOGNITION OF THE MAXIMUM POSITION OF A REVOLVING DIAL OR SLIDE ON MICROSCOPES

CROSS-REFERENCE TO RELATED APPLICATIONS

This application claims priority of International Application No. PCT/EP01/07768, filed Jul. 6, 2001 and German Application No. 100 32 395.2, filed Jul. 6, 2000, the complete disclosures of which are hereby incorporated by reference.

BACKGROUND OF THE INVENTION a) Field of the Invention

Nosepieces or slides, for example, for holding different objectives that are swung into or slid into the beam path, are coded in their individual positions, i.e., every position has a readable code. The coding can be carried out by means of micro-feelers or, optically, by means of reflection couplers or, magnetically, by means of Hall sensors.

b) Description of the Related Art and Recognition of Prior Art Shortcomings

When using Hall sensors, for example, every position is assigned a binary-coded quantity of magnets in a row which uniquely describe the position.

In every scanning position, these magnets are located across from the Hall sensors and can be detected. With exchangeable nosepiece units, e.g., motor-driven objective nosepieces (MOR) or manual objective nosepieces, there are different nosepieces with, e.g., 4, 5, 6 positions. Formerly, detection by the microprocessor was achieved via additional lines characterizing the quantity of maximum positions, or a value for the quantity of maximum positions was stored in the microprocessor.

When the nosepiece with 5 positions is replaced by a nosepiece with 6 positions, depending on the construction of the microscope, the internal control unit must recognize what type is installed so that it can be reported to the software and display. The disadvantage in known constructions consists in the additional wiring from the nosepiece, through the stand wiring, to the control electronics and the interrogation of the latter through corresponding port pins of the microprocessor.

The nosepiece type is permanently entered in the program without additional cable. However, modification would result in a change in the firmware.

Moreover, when the nosepiece type is stored in the microprocessor as a parameter, a suitable input device is required in every case (e.g., PC→download). Another possibility consists in keys or buttons on the microscope. This requires a display for checking the input.

OBJECT OF THE INVENTION

In order to overcome these disadvantages, according to the invention, only the existing position coding is required.

BRIEF DESCRIPTION OF THE DRAWING

In the drawing:

FIG. 1 illustrates a flow chart of the process in accordance with the invention.

DESCRIPTION OF THE PREFERRED EMBODIMENTS

Every nosepiece or slide has a coded position detection arrangement. In order to store the maximum anticipated position as a parameter in the firmware of the microprocessor when changing the nosepiece, the new nosepiece is slid in and the position detection arrangement is connected to the microprocessor. With a manual nosepiece, the detection of the maximum position is carried out in that the manual nosepiece, the detection of the maximum position is carried out in that the nosepiece is mounted in the initial position 1 as provided according to mounting instructions.

The maximum position is adjusted when the microscope is switched on by rotating the nosepiece back by one position. The microprocessor detects the current position and compares it to the maximum position entered in the memory (see flow chart). When the current position ( ) is not the same as the maximum position and is greater than 2, the current position is entered into the system parameters as maximum position. The greater-than-2 test is needed so that no incorrect value is determined for detection in the event that rotation is carried out in the wrong direction. In this case, nothing is entered in the system parameters. With motor-driven nosepieces, the process is carried out in the same way: after installation, the nosepiece is manually rotated backwards from position 1 to the maximum position. The input into the system parameters is carried out in the same way as was described above. With linear slides, the same procedure is followed: the device is switched to position 1 and the slide is slid into the maximum position.

The maximum position is detected and inputted in the system parameters as was described above. Input is conditional upon the slide remaining in this position at least for a certain time (e.g., 3 s).

FIG. 1 shows the described process schematically in a flow chart. This process must be incorporated in the application in such a way that it is run through cyclically (e.g., more than once a second).

Accordingly, the disadvantages of the prior art are alleviated by only requiring the existing pulse coding.

While the foregoing description and drawings represent the present invention, it will be obvious to those skilled in the art that various changes may be made therein without departing from the true spirit and scope of the present invention.

What is claimed is:

1. A method for detecting the maximum quantity of possible positions of an exchangeable nosepiece or slide in a microscope system comprising the steps of:

starting the nosepiece or the slide from an initial position which corresponds to a first position;

adjusting the nosepiece or the slide to a maximum position by rotating the nosepiece back by one position;

comparing this maximum position to a position registered in a memory; and storing the results of the comparison.

* * * * *

UNITED STATES PATENT AND TRADEMARK OFFICE
CERTIFICATE OF CORRECTION

PATENT NO. : 6,744,576 B2
DATED : June 1, 2004
INVENTOR(S) : Gunter Moehler et al.

It is certified that error appears in the above-identified patent and that said Letters Patent is hereby corrected as shown below:

<u>Title page,</u>
Item [75], Inventors, should read as follows:
-- [75] Inventors: Gunter MOEHLER, Rolf-Gero RAU, both of Jena, Germany --

Signed and Sealed this

First Day of February, 2005

JON W. DUDAS
*Director of the United States Patent and Trademark Office*